(12) United States Patent
Fougner et al.

(10) Patent No.: US 10,769,533 B2
(45) Date of Patent: Sep. 8, 2020

(54) SYSTEMS AND METHODS FOR EFFICIENT NEURAL NETWORK DEPLOYMENTS

(71) Applicant: Baidu USA, LLC, Sunnyvale, CA (US)

(72) Inventors: Christopher Fougner, Palo Alto, CA (US); Bryan Catanzaro, Cupertino, CA (US)

(73) Assignee: Baidu USA LLC, Sunnyvale, CA (US)

( * ) Notice: Subject to any disclaimer, the term of this patent is extended or adjusted under 35 U.S.C. 154(b) by 880 days.

(21) Appl. No.: 15/209,499

(22) Filed: Jul. 13, 2016

(65) Prior Publication Data
US 2017/0068889 A1    Mar. 9, 2017

Related U.S. Application Data

(60) Provisional application No. 62/214,816, filed on Sep. 4, 2015.

(51) Int. Cl.
*G06N 3/10* (2006.01)
*G06F 9/48* (2006.01)
(Continued)

(52) U.S. Cl.
CPC .......... *G06N 3/10* (2013.01); *G06F 9/4843* (2013.01); *G06F 9/5027* (2013.01); *G06N 3/063* (2013.01); *G06N 3/08* (2013.01); *H04L 41/16* (2013.01)

(58) Field of Classification Search
CPC ..... G06F 9/4843; G06F 9/5027; G06N 3/063; G06N 3/08; G06N 3/10; H04L 41/16
See application file for complete search history.

(56) References Cited

U.S. PATENT DOCUMENTS 9,251,097 B1 * 2/2016 Kumar ................ G06F 12/1408
9,336,483 B1 * 5/2016 Abeysooriya ............ G06N 3/08
(Continued)

FOREIGN PATENT DOCUMENTS

CN     1714547 A    12/2005
CN   101632236 A    1/2010
(Continued)

OTHER PUBLICATIONS

Hauswald et al., DjiNN and Tonic: DNN as a Service and Its Implications for Future Warehouse Scale Computers, (Jun. 2015) 42nd Annual Int'l Symp. on Computer Architecture, ISCA, at p. 27-40 (Year: 2015).*

(Continued)

*Primary Examiner* — Robert A Cassity
*Assistant Examiner* — Brent Johnston Hoover
(74) *Attorney, Agent, or Firm* — North Weber & Baugh LLP

(57) ABSTRACT

Disclosed are systems and methods that implement efficient engines for computation-intensive tasks such as neural network deployment. Various embodiments of the invention provide for high-throughput batching that increases throughput of streaming data in high-traffic applications, such as real-time speech transcription. In embodiments, throughput is increased by dynamically assembling into batches and processing together user requests that randomly arrive at unknown timing such that not all the data is present at once at the time of batching. Some embodiments allow for performing steaming classification using pre-processing. The gains in performance allow for more efficient use of a compute engine and drastically reduce the cost of deploying large neural networks at scale, while meeting strict application requirements and adding relatively little computational (Continued)

latency so as to maintain a satisfactory application experience.

20 Claims, 8 Drawing Sheets

(51) Int. Cl.
    *G06N 3/063*     (2006.01)
    *G06F 9/50*     (2006.01)
    *G06N 3/08*     (2006.01)
    *H04L 12/24*     (2006.01)

(56) References Cited

U.S. PATENT DOCUMENTS

| | | |
|---|---|---|
| 2005/0122996 A1 | 6/2005 | Azenkot |
| 2005/0281279 A1* | 12/2005 | Dennison ............ H04L 47/50 370/412 |
| 2008/0222646 A1 | 9/2008 | Sigal |
| 2016/0379111 A1* | 12/2016 | Bittner, Jr. ............ G06N 3/04 706/25 |

FOREIGN PATENT DOCUMENTS

| | | |
|---|---|---|
| CN | 101803302 A | 8/2010 |
| CN | 104067255A A | 9/2014 |
| EP | 2339467 A2 | 6/2011 |
| JP | 2002271422 A | 9/2002 |
| JP | 2008159081 A | 7/2008 |
| WO | 2007125942 A1 | 11/2007 |

OTHER PUBLICATIONS

European Search Report dated Feb. 6, 2017, in International Patent Application No. EP 16/18/7221, dated Feb. 6, 2017 (12 pgs).
Hauswald, J., "DjiNN and Tonic:DNN as a Service and Its Implications for Future Warehouse Scale Computers", Proceddsings of the 42nd Annual International Symposium on Computer Architecture, ISCA, Jun. 17, 2015, pp. 27-40 14 pgs).
Amodei, D., " Deep Speech 2: End-toEnd Speech Recognition in English and Mandarin", Baidu Research, Silicon Valley, AI Lab, Dec. 8, 2015, <URL: https://arxiv.org/pdf/1512.02595.pdf/> (28 pgs).
WO 2016/210014 A1 (Microsoft Technology Licensing LLC) Dec. 29, 2016; paragraph [0043]-paragraph [0061] (32 pgs).
Office Action dated Aug. 1, 2017, in Japanese Patent Application No. JP 20161172848, and the machine translation (10 pgs).
E. Elsen, "Optimizing RNN performance," http://svail.github.io/rnn_perf. Accessed: Nov. 24, 2015 (18pgs).
Nervana Systems. Nervana GPU, https://github.com/NervanaSystems/nervanagpu, Accessed: Nov. 6, 2015 (5pgs).
Search Report and Written Opinion dated Sep. 1, 2018, in Chinese Patent Application No. CN201610772116.6A. (7pgs).
Communication pursuant to Article 94(3) EPC, dated Jun. 12, 2018, in European Patent Application No. EP16187221.3A. (6pgs).
Office Action dated May 11, 2018, in Korean Patent Application No. KR1020160113488A. (9pgs).
Office Action dated Jul. 30, 2018, in Korean Patent Application No. KR1020160113488A. (3pgs).
Office Action dated Oct. 22, 2018, in Korean Patent Application No. KR1020160113488A. (8pgs).
Office Action dated Dec. 31, 2018, in Korean Patent Application No. KR1020160113488A. (3pgs).
Summons to attend oral proceedings pursuant to Rule 115(1) EPC, dated Jul. 3, 2020, in European Patent Application No. EP16 187 221.3. (14 pgs).

* cited by examiner

600

| Chunk_stream_i /Time | 0 ms | 20 ms | 40 ms | 60 ms | 80 ms | 100 ms | 120 ms | 140 ms |
|---|---|---|---|---|---|---|---|---|
| Chunk_s1 | + | | | | | | | |
| Chunk_s2 | - | + | | | | | | |
| Chunk_s3 | - | - | + | | | | | |
| Chunk_s4 | - | - | - | + | | | | |
| Chunk_s5 | | - | - | - | + | | | |
| Chunk_s6 | | | - | - | - | + | | |
| Chunk_s7 | | | | - | - | - | + | |
| Chunk_s8 | | | | | - | - | - | + |

PRIOR ART

| Chunk_stream_i /Time | 0 ms | 20 ms | 40 ms | 60 ms | 80 ms | 100 ms | 120 ms | 140 ms |
|---|---|---|---|---|---|---|---|---|
| Chunk_s1 | + | + | | | | | | |
| Chunk_s2 | + | + | | | | | | |
| Chunk_s3 | + | + | | | | | | |
| Chunk_s4 | + | + | | | | | | |
| Chunk_s5 | + | + | | | | | | |
| Chunk_s6 | + | + | | | | | | |
| Chunk_s7 | + | + | | | | | | |
| Chunk_s8 | + | + | | | | | | |
| Chunk_s9 | + | + | | | | | | |
| Chunk_s10 | + | + | | | | | | |
| Chunk_s11 | - | - | + | + | | | | |
| Chunk_s12 | - | - | + | + | | | | |
| Chunk_s13 | - | - | + | + | | | | |
| Chunk_s14 | - | - | + | + | | | | |
| Chunk_s15 | - | - | + | + | | | | |
| Chunk_s16 | - | - | + | + | | | | |
| Chunk_s17 | - | - | + | + | | | | |
| Chunk_s18 | - | - | + | + | | | | |
| Chunk_s19 | - | - | + | + | | | | |
| Chunk_s20 | - | - | + | + | | | | |

FIG. 7

SYSTEMS AND METHODS FOR EFFICIENT NEURAL NETWORK DEPLOYMENTS

CROSS REFERENCE TO RELATED PATENT APPLICATIONS

This application claims the priority benefit under 35 USC § 119(e) to commonly assigned U.S. Provisional Patent Application No. 62/214,816, filed on Sep. 4, 2015, entitled "Systems and Methods for Efficient Neural Network Deployments" and listing Christopher Fougner and Bryan Catanzaro as inventors. The aforementioned patent document is herein incorporated by reference as to its entire content and for all purposes.

TECHNICAL FIELD

The present disclosure relates generally to network management, and more specifically to systems and methods for computationally-intensive matters, such as neural network deployments.

DESCRIPTION OF THE RELATED ART

Today's typical infrastructure for deploying deep neural networks is shown in figure ("FIG.") 1. Requests stream via the Internet into a data center. The requests are routed by load balancer 102 onto one of many servers 104 located at data center 110. Each request 106 is handled by a single worker thread running on one of these servers 104, which then returns results 108.

Architecture 100 is simple to understand, since the code for running one of the neural networks needs to run only on one thread, making the code simple to write. It is also simple to reason about latency because each request 106 is handled immediately by a worker thread and the latency is typically minimized. Finally, because each request 106 is handled independently, this architecture makes it easier to reason about failover.

While such systems 100 may be easy to implement, they are not very efficient. Accordingly, what is needed are systems and methods that provide for more efficient neural network deployments while satisfying processing requirements.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 6 presents a graphic that depicts the situation where chunks of data from four streams are processed within 80 ms in a traditional setting.

FIG. 7 presents an exemplary graphic that depicts the situation where chunks of data from 20 streams are processed within 80 ms in a batched setting in accordance with embodiments of the present disclosure.

DETAILED DESCRIPTION OF THE PREFERRED EMBODIMENTS

Figure 1:
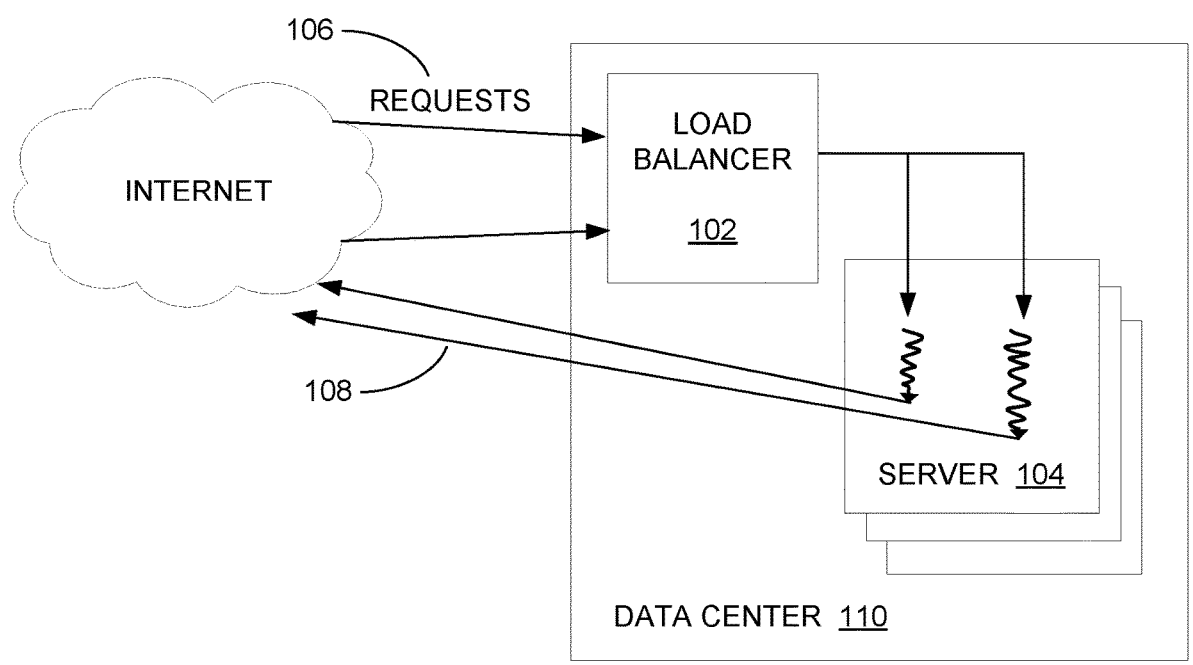
FIG. 1 depicts a typical infrastructure configuration for deploying deep neural networks.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

While neural network deployments and classifying requests are used as examples in the current patent disclosure, it shall be noted that the present disclosure is not so limited and that aspects of the present disclosure may be applied or implemented for use with other purposes, including without limitation other computationally intensive matters.

A. General Overview

Deep Neural Networks are becoming increasingly important in many areas, including advertising placement, image and video recognition, speech recognition, language processing, web search, amid others. Although Deep Neural Networks provide relatively good accuracy for many important tasks, deploying them at scale can be expensive. This is primarily due to the computational burden of classifying data points with a large neural network that may require large amounts of mathematical operations.

Complicating the deployment of large neural networks is the architecture of a typical data center. As requests come in via the Internet, data centers load balance these requests across many servers. To provide reliable service, a data center should also provide failover capabilities that allow requests to be re-routed in case of server or network failure. Additionally, Internet services tend to require a low-latency response in order to keep services interactive. These requirements have led to today's systems for deploying neural networks, where individual requests are sent by load balancers to worker servers that perform the computation. Each request is served by a single thread in order to control latency and resiliency requirements.

From a computational point of view, using a processor to service multiple requests from independent threads is sub-optimal. This is because the same neural network model is repeatedly loaded from memory for each thread. It would be much more efficient to service multiple requests in a single thread, which can then orchestrate a pool of threads to share the burden of loading the neural network model from memory so as to facilitate re-use of weights. In other words, by removing the one-to-one relationship between threads and users assigned to threads that each individually load the neural network model and, instead, using one thread to orchestrate all the requests, multiple threads may collaborate in loading the neural network and performing (matrix-to-matrix multiplication) computations.

Presented herein are embodiments of batching systems and methods that allow a plurality of requests to be orchestrated by a single thread that shares a common neural network model and, thus, make the computation of each request much more efficient. In embodiments, the batching system is built to significantly increase efficiency of classifying requests, while meeting strict latency constraints and preserving interactivity. Embodiments of this batching system may be used both in environments where classification requests are fully formed as well as when classification is performed on data streams.

As noted above, although the typical architecture is easy to reason about, it is computationally inefficient. This is primarily because each worker thread independently loads the neural network model, despite the fact that in many cases the same model is used. As a consequence, the traditional way of deploying neural networks wastes a great deal of memory bandwidth by loading and reloading the same neural network model from memory. Therefore, it would be desirable to have systems and methods in place that allow for more efficient neural network deployment.

B. Example Implementation Embodiments

Figure 2:
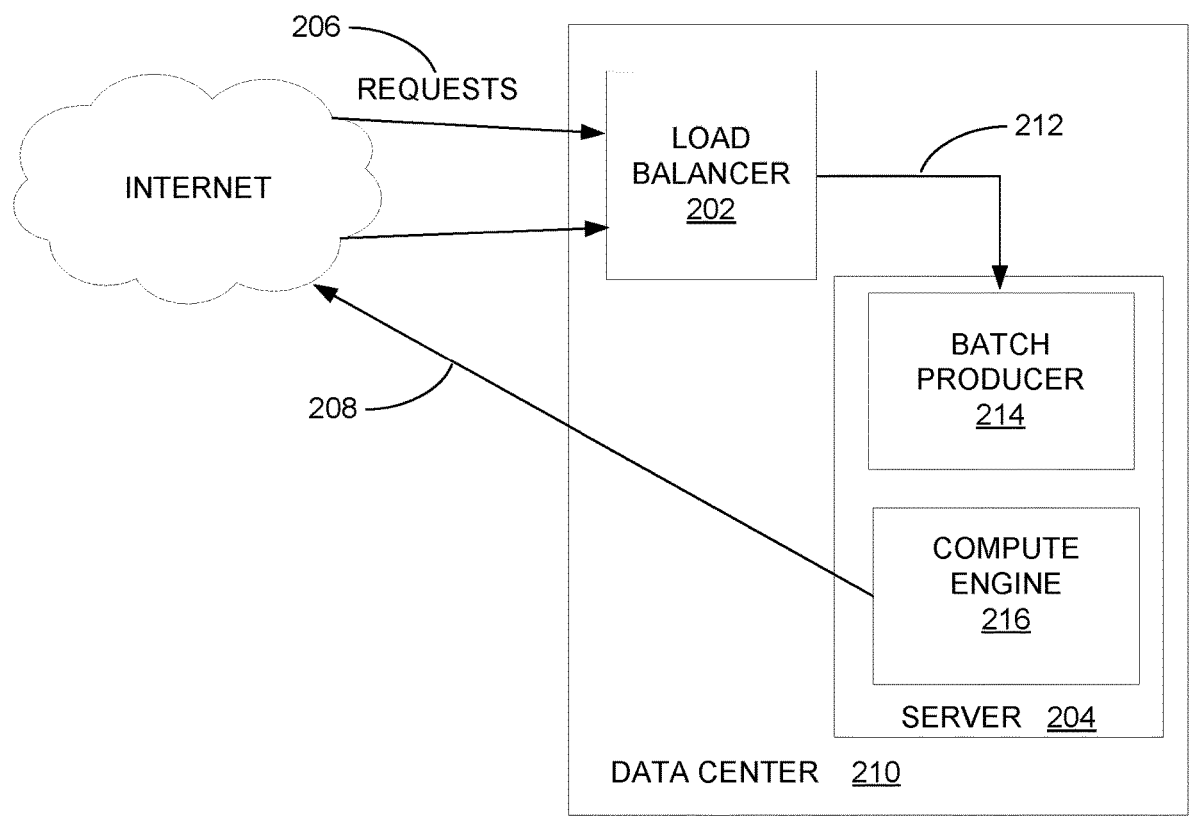
FIG. 2 depicts an infrastructure configuration for deploying neural networks in accordance with embodiments of the present disclosure.

FIG. 2 depicts an infrastructure configuration for deploying neural networks in accordance with embodiments of the present disclosure. Infrastructure 200 comprises data 210 center that may comprise load balancer 202, one or more servers 204 that each comprises a batch producer 214 and a computer engine 216.

In embodiments, load balancer 202 sends requests 206 to servers 204 in data center the 210 as shown in FIG. 1. In embodiments, load balancer 202 balances the requests across the servers 204 in data 210 center to keep server usage efficient. In embodiments, data arriving for a request that has already been sent to a particular server 204 will be routed to the same server 204. Server 204 in FIG. 2 comprises batch producer 214 that, in embodiments, dynamically assembles requests 206 into batches of data processing requests that are input to compute engine 216. In embodiments, batch producer 214 generates batches based on application-level constraints, such as a required end-user computational latency of performing a classification, based on capabilities of compute engine 216, or both.

In embodiments, the batches of requests generated by batch producer 214 comprise chunks of data. It shall be understood that the chunks of data need not be of the same length as data packets 212 sent by load balancer 202 and arriving at data center 210.

Figure 3:
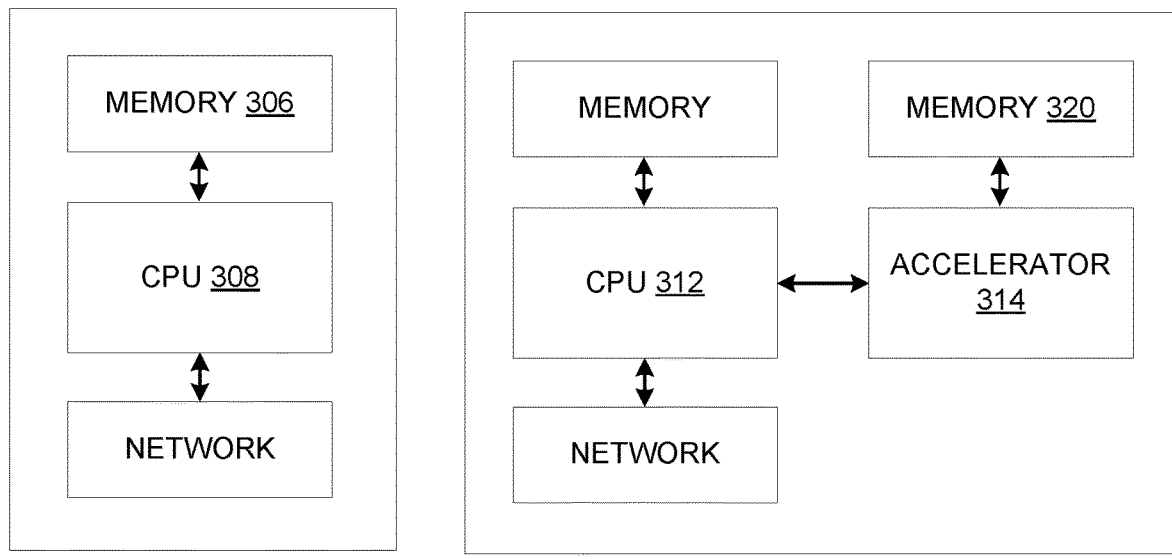
FIG. 3 depicts example server architectures that may be used for deploying neural networks in accordance with embodiments of the present disclosure.

FIG. 3 depicts example server architectures that may be used for deploying neural networks in accordance with embodiments of the present disclosure. Embodiments of the architecture allow for the efficient use of any compute engine to perform the neural network classification. For example, a multi-threaded implementation may be used on a central processing unit (CPU) 312, an accelerator 314, such as a field-programmable gate array (FPGA), a graphics processing unit (GPU), or any other processing/information handling device. In embodiments, the compute engine may be implemented on a processor that shares memory 306 with the main server CPU 308, or on a processor that has its own memory 320, as illustrated in FIG. 3.

In embodiments, the batch producer may function to hide latencies involved in transferring request data and results (e.g., transferring of data to and from accelerator 314). For example, the batch producer may accept requests while, at the same time, sending batches to the compute engine. As a result of overlapping the transfer of data from a previous batch while receiving data from the next batch, the batch producer may effectively hide or mitigate latencies.

It should be noted that embodiments of the present disclosure are more efficient than prior approaches when evaluating neural networks, because the batch producer produces batches that comprise data from a plurality of users and are processed on a shared neural network model. For quite some time, the arithmetic intensity of many types of processors has been increasing. This means that memory bandwidth is becoming relatively more important, while mathematical operations are becoming relatively less expensive. This conserves memory bandwidth and, therefore, is especially useful as processors become even more arithmetically intense. Embodiments of the present disclosure are also well suited for throughput-oriented processors, such as GPUs that require a significant amount of work in order to saturate efficiency.

Presented below is an example implementation for a general and challenging case that involves classifying a streaming input comprising an ordered sequence of packets of fixed or variable length, while satisfying a latency constraint. In embodiments, non-streaming inputs may be handled in a similar same manner by designating each packet as the last packet of a (trivial) stream.

As used herein, the terms "request," "user request," "data processing request," "stream," "streaming input," and "stream of data" are used interchangeably. The term "user" is associated with a "stream" in that each stream is associated with a single user. The term "chunk" refers to a size of data related to a neural network input size. The terms "packet" shall be understood to mean a group of data that can be transported across a network. The term "packet" shall not be interpreted as limiting embodiments of the present invention to Ethernet or Layer 3 networks. The terms "packet," "frame," "data," "datagram," "cell," or "data traffic" may be used interchangeably and may be replaced by other terminologies referring to a set of data.

While it is assumed that a neural network model is used to process the data, one skilled in the art will appreciate that other techniques, models, or networks may be employed to process data in accordance with the embodiments of the present disclosure.

"Data" refers to any of a number of types of input data. For example, when transcribing an utterance in a speech setting, each packet may represent a few milliseconds (e.g., 80 ms) of audio. In a video context, each packet may represent the difference between a current image and a previous image. In image recognition, each packet may represent a tile of a complete image.

In embodiments, a latency constraint may state that a complete stream be processed in a fixed amount of time after the arrival of the last packet in the stream. This may be expressed as:

$$T_{whole\ stream\ processed} < T_{arrival\ of\ last\ packet} + \Delta_{acceptable\ delay},$$

where $T_{whole\ stream\ processed}$ denotes the time at which processing of the whole stream should be completed, $T_{arrival\ of\ last\ packet}$ denotes the arrival time of the last packet, and $\Delta_{acceptable\ delay}$ denotes the application-dependent acceptable delay. In an online setting, where latency is typically quite critical, $\Delta_{acceptable\ delay}$ is likely to be less than 1 second.

In embodiments, one goal may be to process as many streams concurrently as possible, while satisfying a latency constraint (e.g., maintain high throughput). In comparison, existing approaches handle each stream individually and independently in order to ensure low latency and maintain flexibility.

Figure 4:
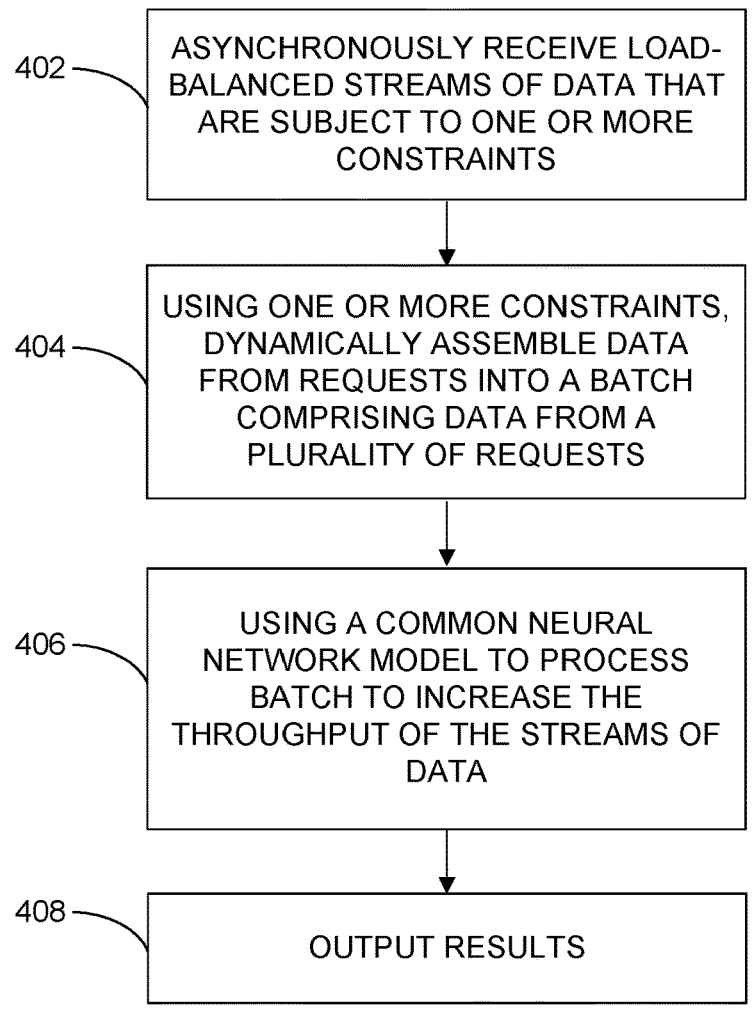
FIG. 4 illustrates an exemplary batching method for deploying neural networks to increase throughput of data processing requests in accordance with embodiments of the present disclosure.

In embodiments of the present disclosure, a model/architecture is employed in which a plurality of requests is simultaneously piped through to a compute engine that implements the neural network. In embodiments, a batching method is used to allow a neural network to process data for multiple simultaneous users in a similar fashion as processing data for a single user. FIG. 4 illustrates an exemplary batching method for deploying neural networks to increase throughput of data processing requests in accordance with embodiments of the present disclosure. The batching method starts at step 402, when a batch producer accepts, e.g., in an asynchronous manner, data processing requests comprising packets that are associated with a plurality of users. The packets may arrive in streams that each are associated with a user. The packets may arrive, for example, via a load-balancer that load-balances streams of data from a plurality of users. In embodiments, the arrival times of the packets may be unknown and subject to application-level constraints, such as latency constraints, performance characteristics of the compute engine, and the like.

At step 404, a batch producer dynamically assembles the data from requests, within the application-level constraints, into a batch that comprises data from one or more requests, e.g., stateful requests.

At step 406, the batch is processed using a common neural network (e.g., to perform classification on an audio stream) that is loaded to and/or from memory only once so as to reduce the computational latency requirement, thereby, increasing the throughput of the streams of data.

At step 408, results, such as the results of a classification, are output. As a result, memory bandwidth is conserved and computational efficiency is increased.

In embodiments, the batch producer runs in a single thread, and has the task of:
a) pre-processing the data;
b) packing the pre-processed data into a batch matrix that is shared by many users; and
c) forwarding the batch matrix to the compute engine.

In embodiments, the batch producer maintains three types of data structures:
1) an input buffer for each user;
2) a pre-processed buffer for each user; and
3) a linked list of batches (i.e., matrix inputs to the neural network), which may be denoted as the batch list. In applications such as speech or video processing, the neural network may process the batches in a predetermined order to ensure that the compute engine produces a correct output. In embodiments, batches may be shared between two or more users. In embodiments, pre-processing may not be performed.

Figure 5:
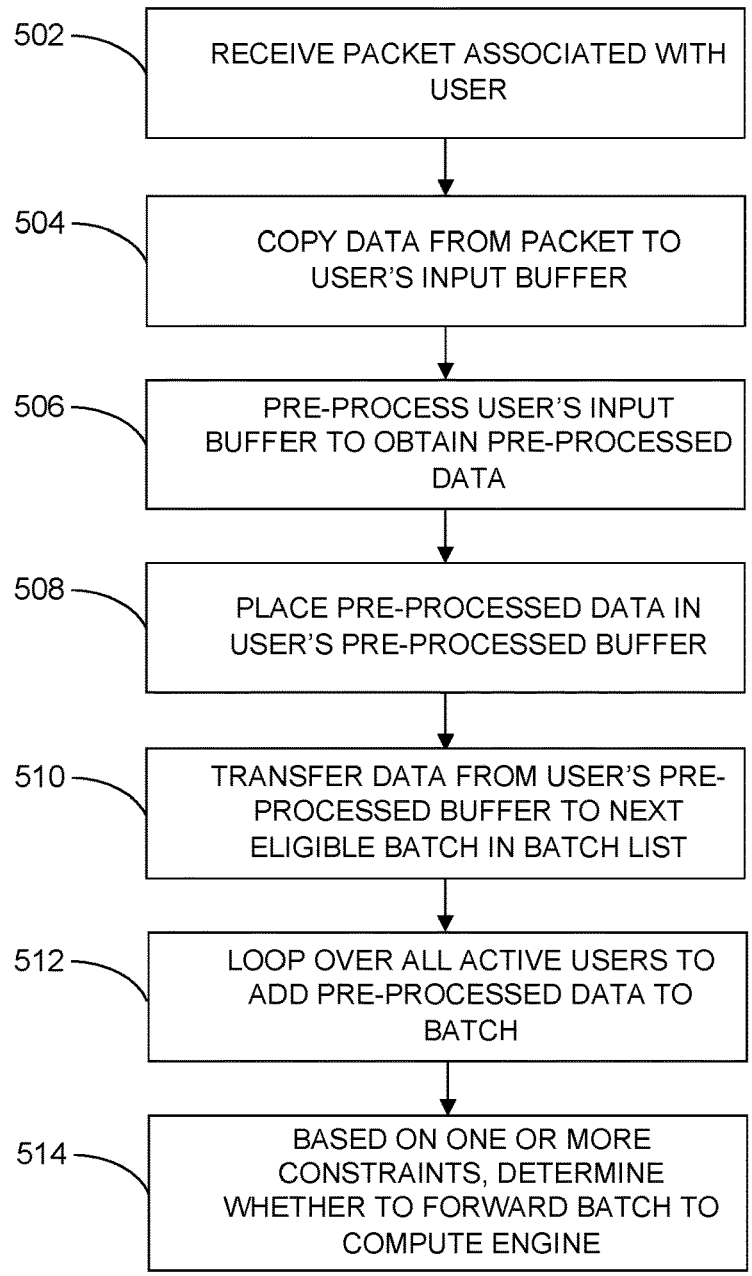
FIG. 5 illustrates an exemplary batching method using pre-processing in accordance with embodiments of the present disclosure.

FIG. 5 illustrates an exemplary batching method using pre-processing in accordance with embodiments of the present disclosure. The batching method starts at step 502, when a packet for a particular user arrives at the batch producer.

At step 504, the data is copied to an input buffer for that user, and the packet may then be discarded.

At step 506, the input buffer is pre-processed. Examples of pre-processing are converting audio signals to spectrograms and other processing. In embodiments, pre-processing may not be performed.

Once pre-processing is completed, at step 508, the results are placed in a pre-processed buffer for that user. In some applications, the pre-processing may take place in chunks of data. For example, speech systems frequently use spectrograms that require fixed-sized input windows of speech. As a result, in embodiments, it may not be guaranteed that the packet for a user can be pre-processed without data from future packets.

In embodiments, at step 510, if the pre-processed buffer is at least as large as the input required by the neural network, a chunk (whose size may be determined by the neural network input size) is transferred from the pre-processed buffer to the next eligible batch in the batch list. In embodiments, for a batch to be eligible, it should not already contain any data being processed for the current user. In embodiments, the size of the batch is limited such that full batches are also not be eligible. In image or video recognition applications, a chunk may represent a full image, and in speech recognition applications, a chunk may represent a fixed length of the input spectrogram.

In embodiments, at step 512, the batch producer may loop over all active users to fill up the batch.

At step 514, the batch producer may then decide whether to send one or more batches to the compute engine. In embodiments, there may be several ways to make a decision:

1) One simple approach is to send a batch only if the compute engine is not busy.

2) Another, more structured approach is to send a batch if one of the following conditions is satisfied:
   a) The batch contains data for a user, whose last packet has arrived, and the processing time for the compute engine plus the time needed for an extra iteration through the batch producer would exceed the delay constraint.
   b) The batch list is sufficiently full, such that if the last packet for any active user were to arrive now, it would not be possible to satisfy the latency constraint.

In embodiments, to be able to implement the latter approach, reasonably accurate bounds on processing times for different parts of the system may be necessary. For greater efficiency, in embodiments, the batch producer may assemble both latency-sensitive batches, which may run at a higher priority but lower computational efficiency in order to satisfy latency constraints, and larger but more efficient throughput-oriented batches that handle the majority of the computational work. In embodiments, the batch producer continues looping until the process is terminated.

Considering a scenario where the latency constraint is 80 ms, and it takes 20 ms for the compute engine to process a chunk of data for one user and 40 ms to process chunks of data for one batch of ten users. In the traditional example, to satisfy the latency constraint, data from only four streams can be processed simultaneously. FIG. 6 presents a graphic that depicts a situation where chunks of data from four streams are processed in 80 ms, one user at a time, in the traditional setting.

In contrast, using a batching approach according to various embodiments of the present disclosure, one can simultaneously process chunks of data from 20 streams in batches of ten users at time. FIG. 7 presents an exemplary graphic that depicts the situation in which 40 ms chunks of data from 20 streams are processed within 80 ms in a batched setting, according to embodiments of the present disclosure. Blocks that are denoted with a "+" indicate that a chunk of data from that stream is being processed, and blocks denoted with a "−" indicate that a stream is blocked.

One skilled in the art will appreciate that a greater difference between the compute time of the compute engine and the latency requirement will create a greater the opportunity for batching.

In embodiments, aspects of the present patent document may be directed to information handling systems/computing devices. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
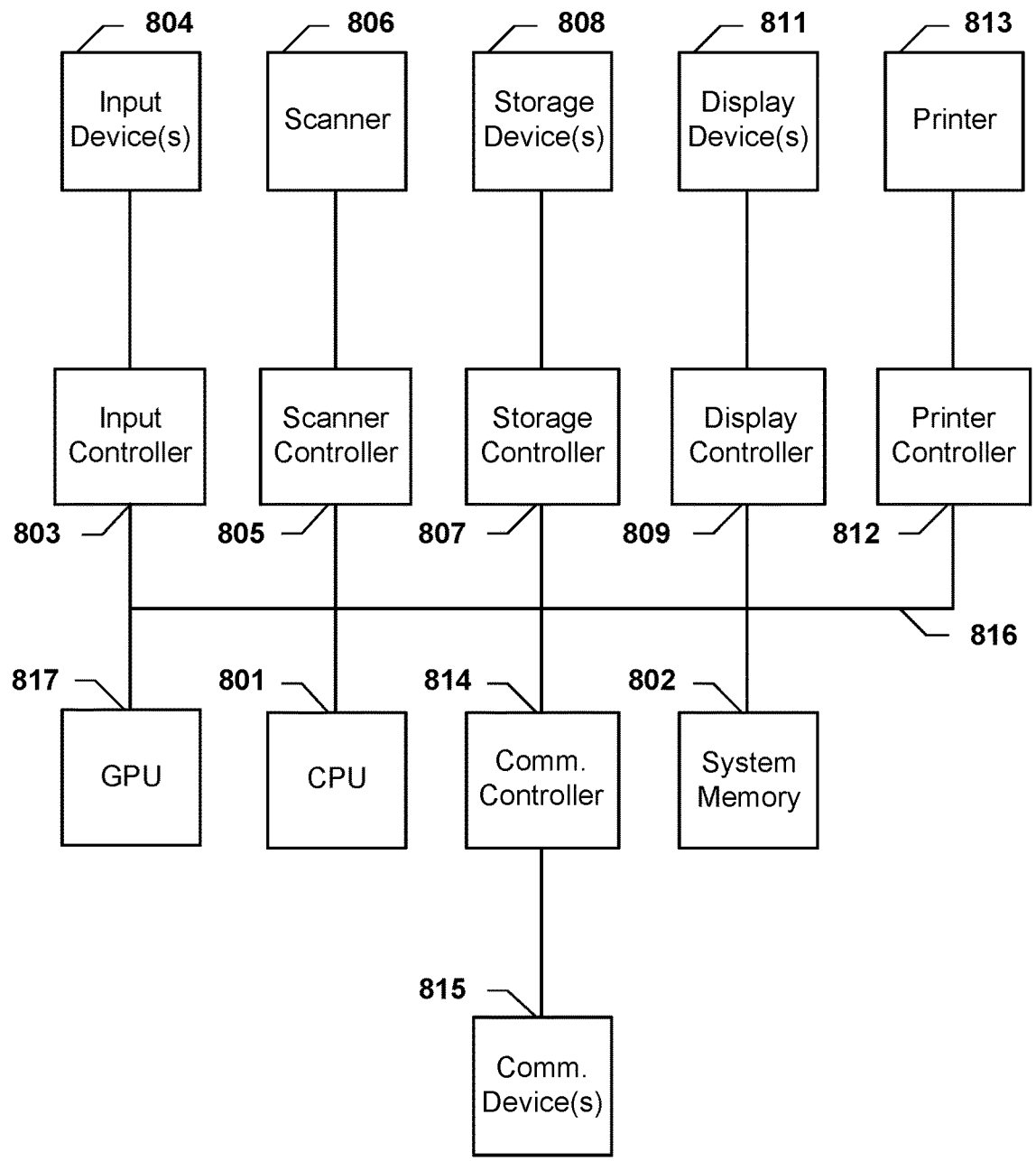
FIG. 8 depicts a simplified block diagram of a computing device/information handling system, in accordance with embodiments of the present disclosure.

FIG. 8 depicts a simplified block diagram of a computing device/information handling system (or computing system) according to embodiments of the present disclosure. It will be understood that the functionalities shown for system 800 may operate to support various embodiments of an information handling system—although it shall be understood that an information handling system may be differently configured and include different components.

As illustrated in FIG. 8, system 800 includes one or more central processing units (CPU) 801 that provides computing resources and controls the computer. CPU 801 may be implemented with a microprocessor or the like, and may also include one or more graphics processing units (GPU) 817 and/or a floating point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A batching method for increasing throughput of data processing requests, the method comprising:
   receiving data associated with requests to be processed by using a neural network model, each request of at least some of the requests being subject to one or more constraints and at least some of the requests being received asynchronously;
   dynamically assembling at least some of the data into a batch using at least one of the one or more constraints by performing steps comprising:
      for each request of at least some of the requests, using at least one of the one or more constraints associated with the request to select whether the request should be included in a batch; and
      assembling data associated with the selected requests into a batch; and
   processing the batch using a single thread that orchestrates a plurality of threads to share a burden of loading the neural network model from memory to increase data throughput.

2. The method according to claim 1, wherein the one or more constraints comprise a latency requirement.

3. The method according to claim 2, wherein the latency requirement comprises at least one of a requirement to process a request within a predetermined amount of time after a last packet in the request arrives or a requirement to not add data into a batch that already contains data from that request.

4. The method according to claim 2, further comprising:
   assembling data from two or more requests that are latency sensitive into a latency-sensitive batch; and
   assembling data from two or more requests that are less latency sensitive into a throughput-oriented batch for processing, the latency-sensitive batch having a higher priority for processing than the throughput-oriented batch.

5. The method according to claim 1, wherein the batch comprises at least one stateful request.

6. The method according to claim 1, further comprising the steps of:
   pre-processing the data, the data comprising a packet;
   assembling pre-processed data into a batch matrix that is shared by at least two of the plurality of users; and
   providing the batch matrix to a compute engine.

7. The method according to claim 6, further comprising maintaining a batch list and, for each of a plurality of users: an input buffer and a pre-processed buffer.

8. The method according to claim 7, further comprising performing the steps of:
   copying data from the packet to the input buffer associated with the one of the plurality of users;
   discarding the packet;
   pre-processing the input buffer to obtain a first set of results; and
   placing the first set of results in the pre-processed buffer associated with the one of the plurality of users.

9. The method according to claim 8, wherein the step of pre-processing the input buffer comprises transferring a predetermined amount of data that represents at least a portion of an image or a length of a spectrogram from the pre-processed buffer associated with the one of the plurality of users to an eligible batch in the batch list.

10. The method according to claim 8, further comprising, in response to looping over users to fill up the batch list, deciding, based on a status of the compute engine, whether to provide one or more batches to the compute engine.

11. The method according to claim 10, wherein the step of deciding is based on a determination of at least one of a time needed for an additional iteration exceeding a delay constraint or an effect of a status of the batch list on a latency requirement.

12. A batch processing system for processing requests involving a neural network model, the system comprising:
   one or more computing devices, in which each computing device comprises:
      at least one processor and a memory device;
      a batch producer component that receives data associated with different requests and dynamically assembles chunks of data from at least two different requests into a batch according to one or more constraints by performing steps comprising:
         for each request of at least some of the different requests, using at least one of the one or more constraints associated with the request to select whether the request should be included in a batch; and
         assembling data associated with the selected requests into a batch; and
      a compute engine component communicatively coupled to the batch producer, the compute engine component processes the batch in a single thread that orchestrates a plurality of threads to share a burden of loading the neural network model from memory to increase data throughput.

13. The batch processing system according to claim 12 wherein an input size of a neural network model determines a size for the chunks of data.

14. The batch processing system according to claim 12 further comprising a load balancer that receives, at asynchronous timings, a plurality of requests and load balances the plurality of requests across the one or more computing devices such that data associated with a same request are sent to a same computing device.

15. The batch producer according to claim 12, wherein the compute engine separates the processed batch into a plurality of responses that each are associated with one user.

16. A batch producer comprising:
   non-transitory computer-readable medium or media comprising one or more sequences of instructions which, when executed by at least one processor, causes steps to be performed comprising:
   receiving data associated with requests to be processed by using a neural network model, each of the requests being subject to one or more constraints;
   dynamically assembling at least some of the data into a batch using at least one of the one or more constraints by performing steps comprising:
      for each request of at least some of the requests, using at least one of the one or more constraints associated with the request to select whether the request should be included in a batch; and
      assembling data associated with the selected requests into a batch; and
   causing the batch to be processed using a single thread that orchestrates a plurality of threads to share a burden of loading the neural network model from memory to increase data throughput.

17. The batch producer according to claim 16, wherein the batch producer comprises an input buffer and a pre-processed buffer for each of a plurality of users, each user being associated with a request to be processed.

18. The batch producer according to claim 16, wherein the batch producer receives at least some of the data processing requests asynchronously.

19. The batch producer according to claim 16, wherein the one or more constraints comprise at least one of a requirement to process a request within a predetermined amount of time after a last packet in the request arrives or a requirement to not add data to a batch that already contains data from that request.

20. The batch producer according to claim 16, wherein the step of dynamically assembling at least some of the data into a batch using at least one of the one or more constraints comprises:
   assembling data from two or more requests that are latency sensitive into a latency-sensitive batch; and
   assembling data from two or more requests that are less latency sensitive into a throughput-oriented batch for processing, the latency-sensitive batch having a higher priority for processing than the throughput-oriented batch.

* * * * *